Jan. 7, 1964        A. NOVICK        3,116,668
ROTARY ENVELOPE MACHINE
Original Filed Dec. 21, 1956        14 Sheets-Sheet 1
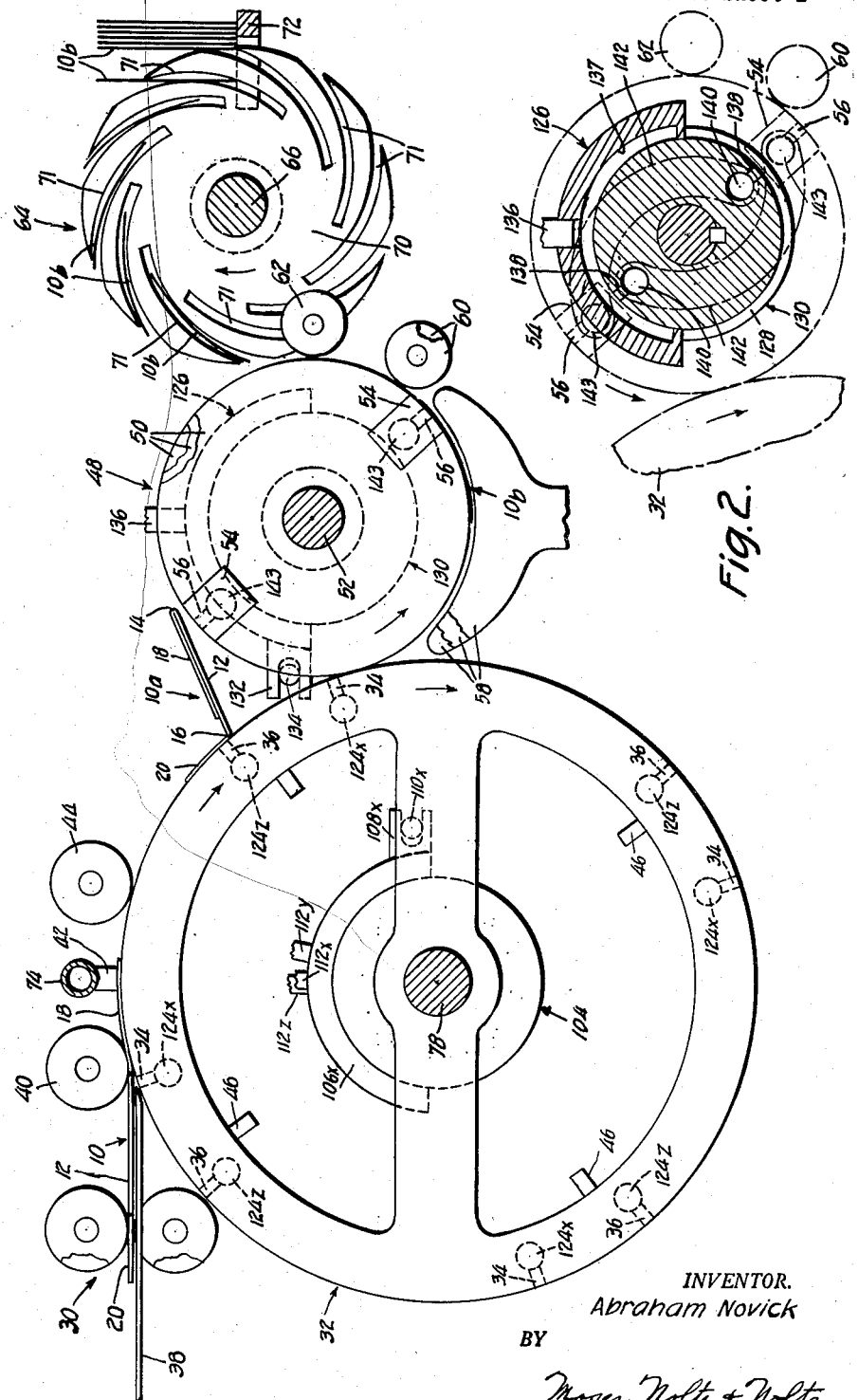
INVENTOR.
Abraham Novick
BY
Moses, Nolte + Nolte
ATTORNEYS

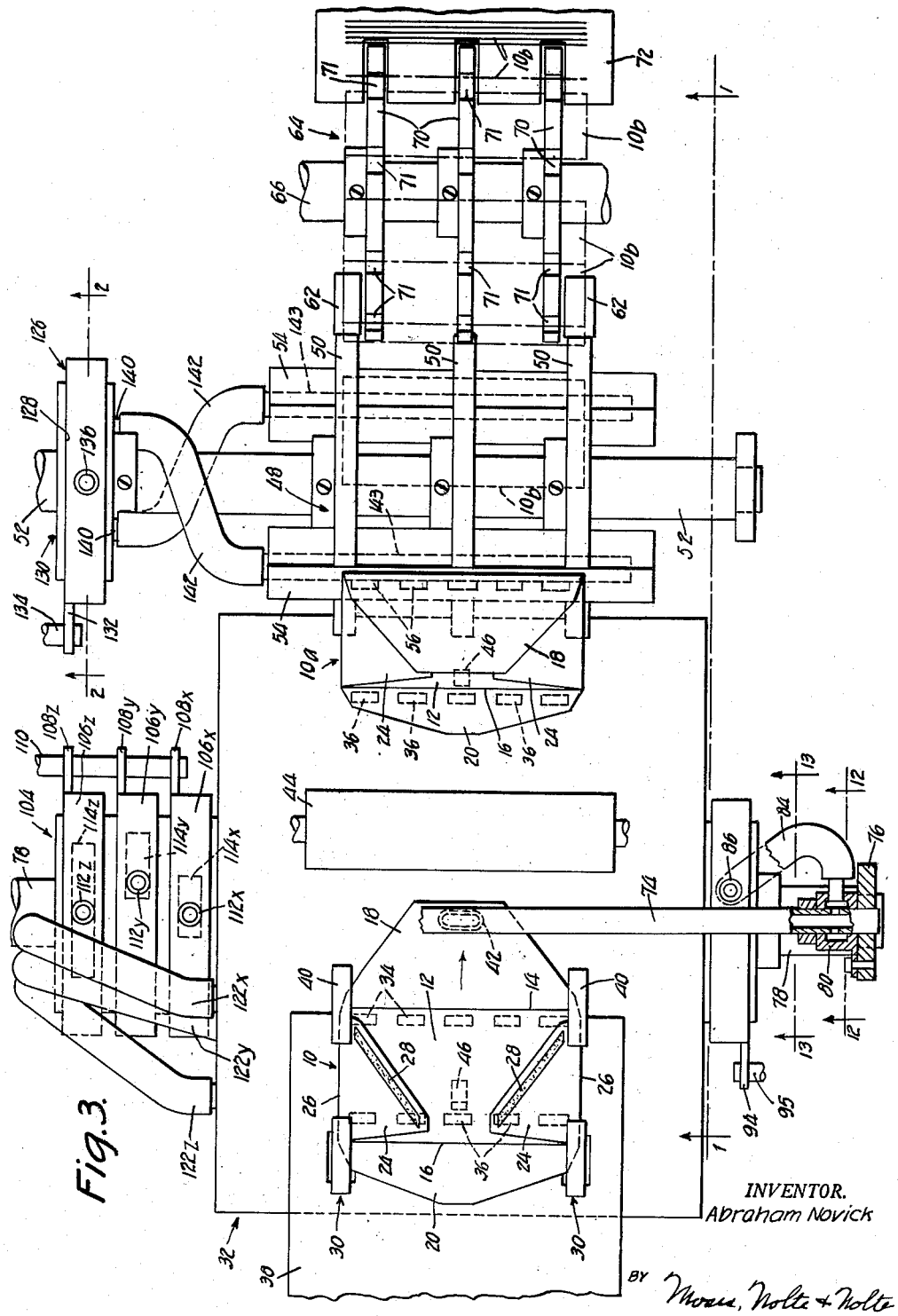

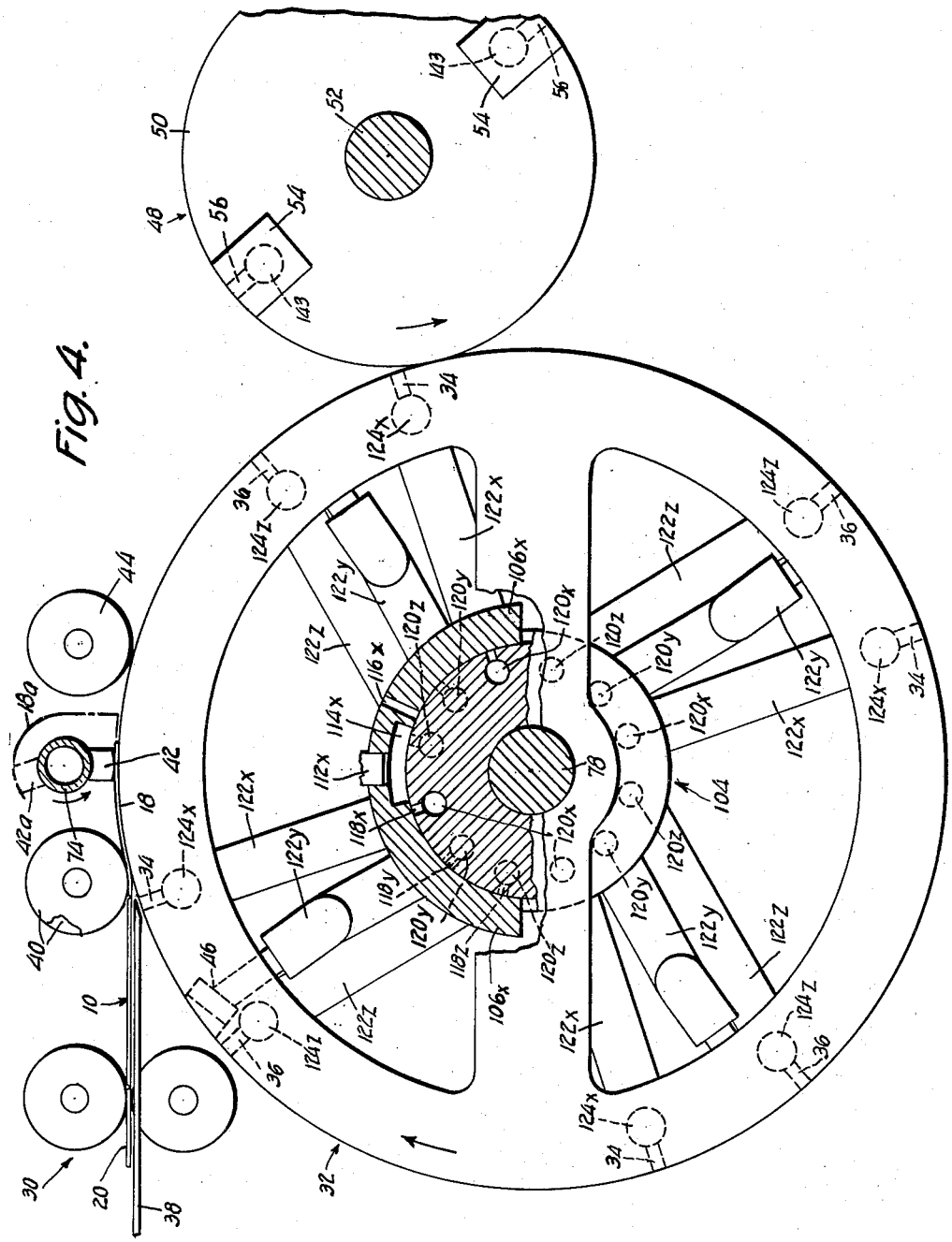

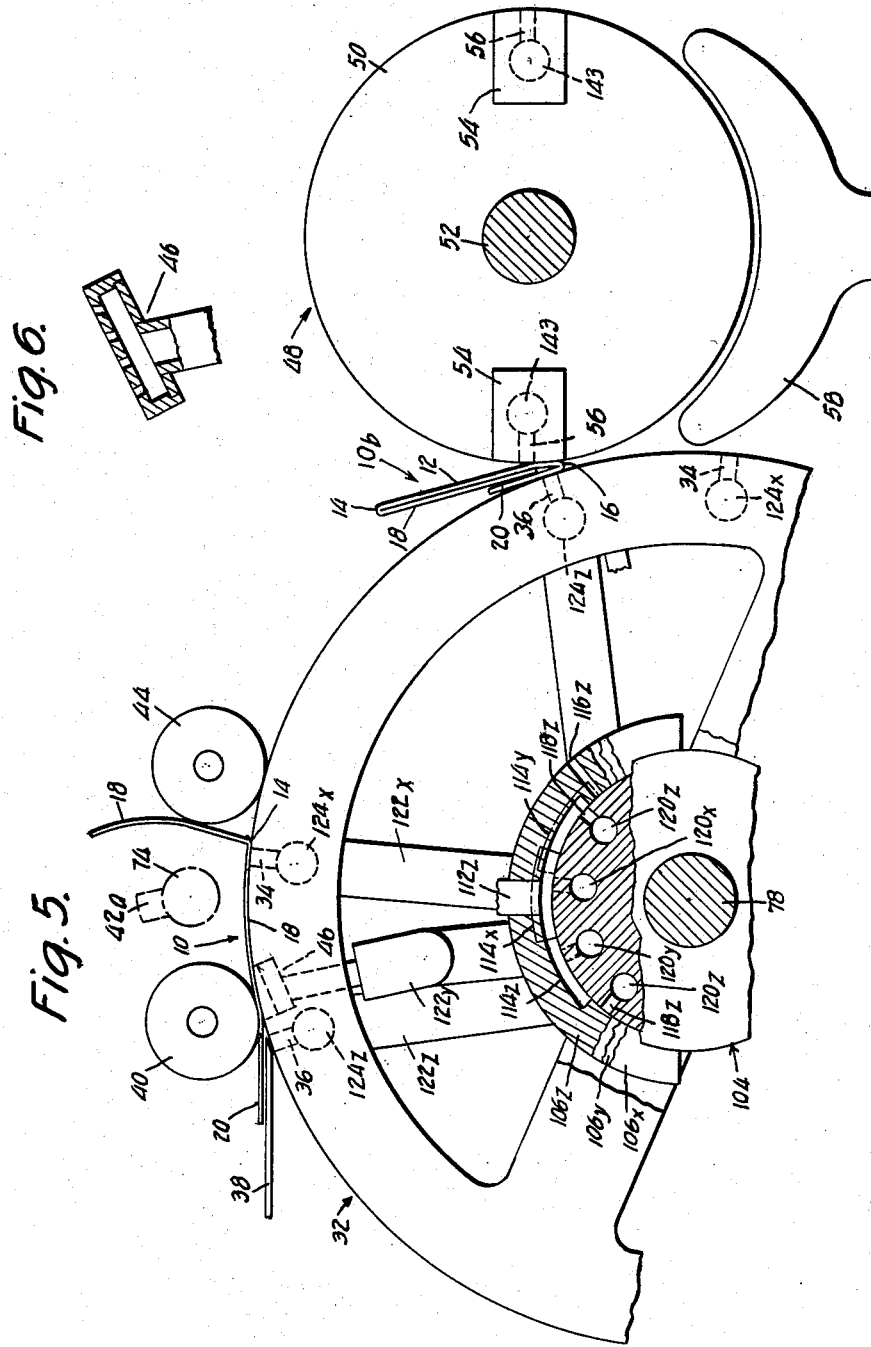

Jan. 7, 1964  A. NOVICK  3,116,668
ROTARY ENVELOPE MACHINE
Original Filed Dec. 21, 1956  14 Sheets-Sheet 5

INVENTOR.
Abraham Novick
BY
Moses, Nolte & Nolte
ATTORNEYS

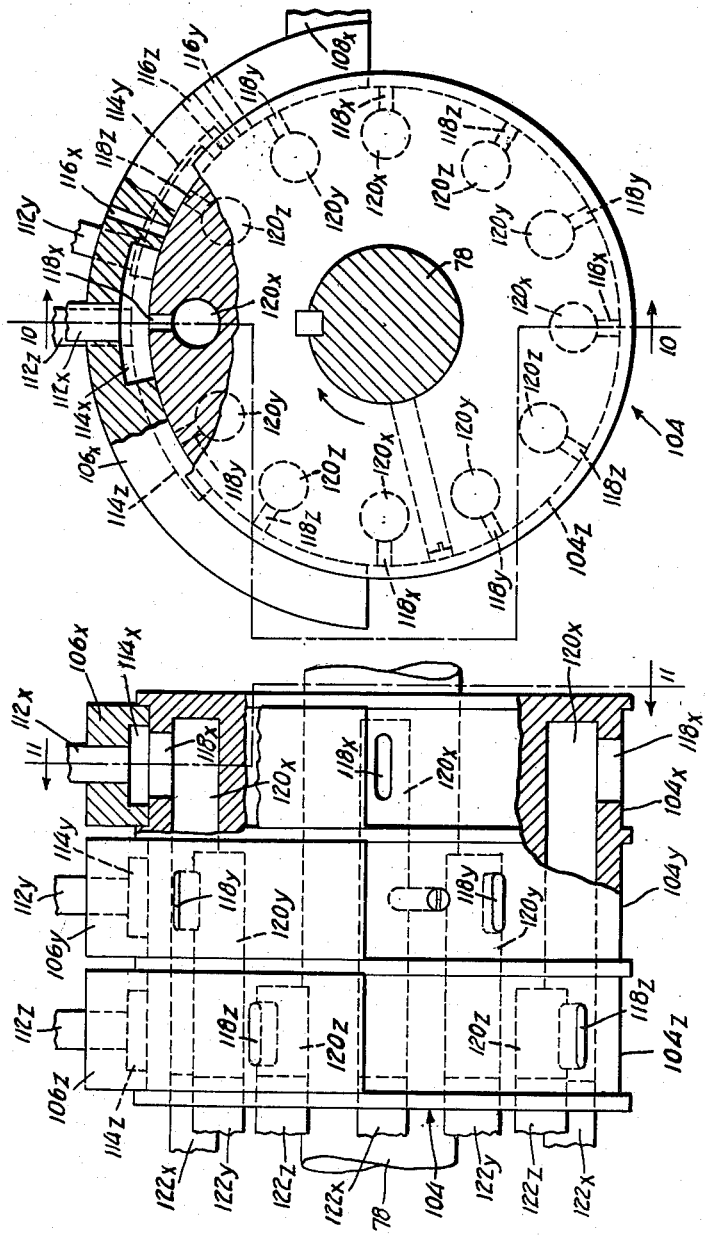

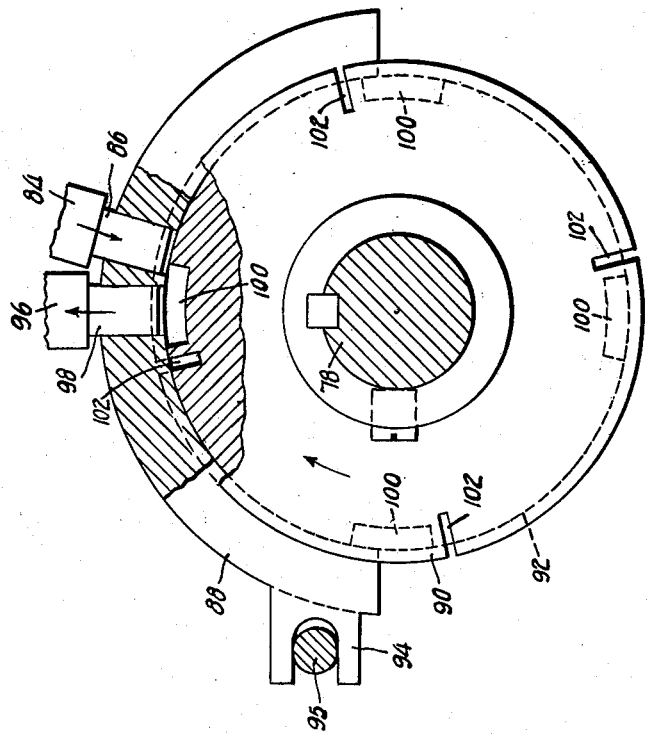
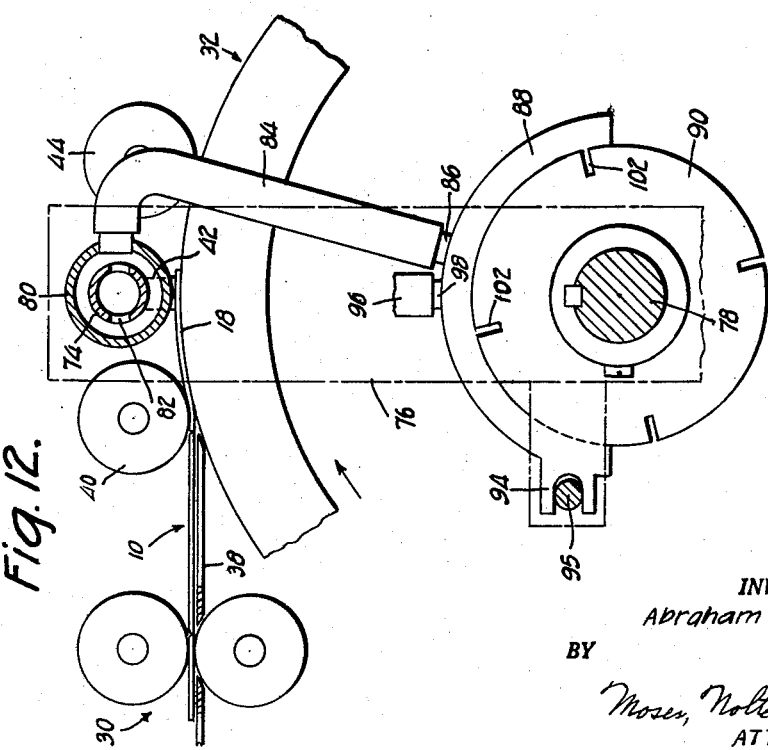

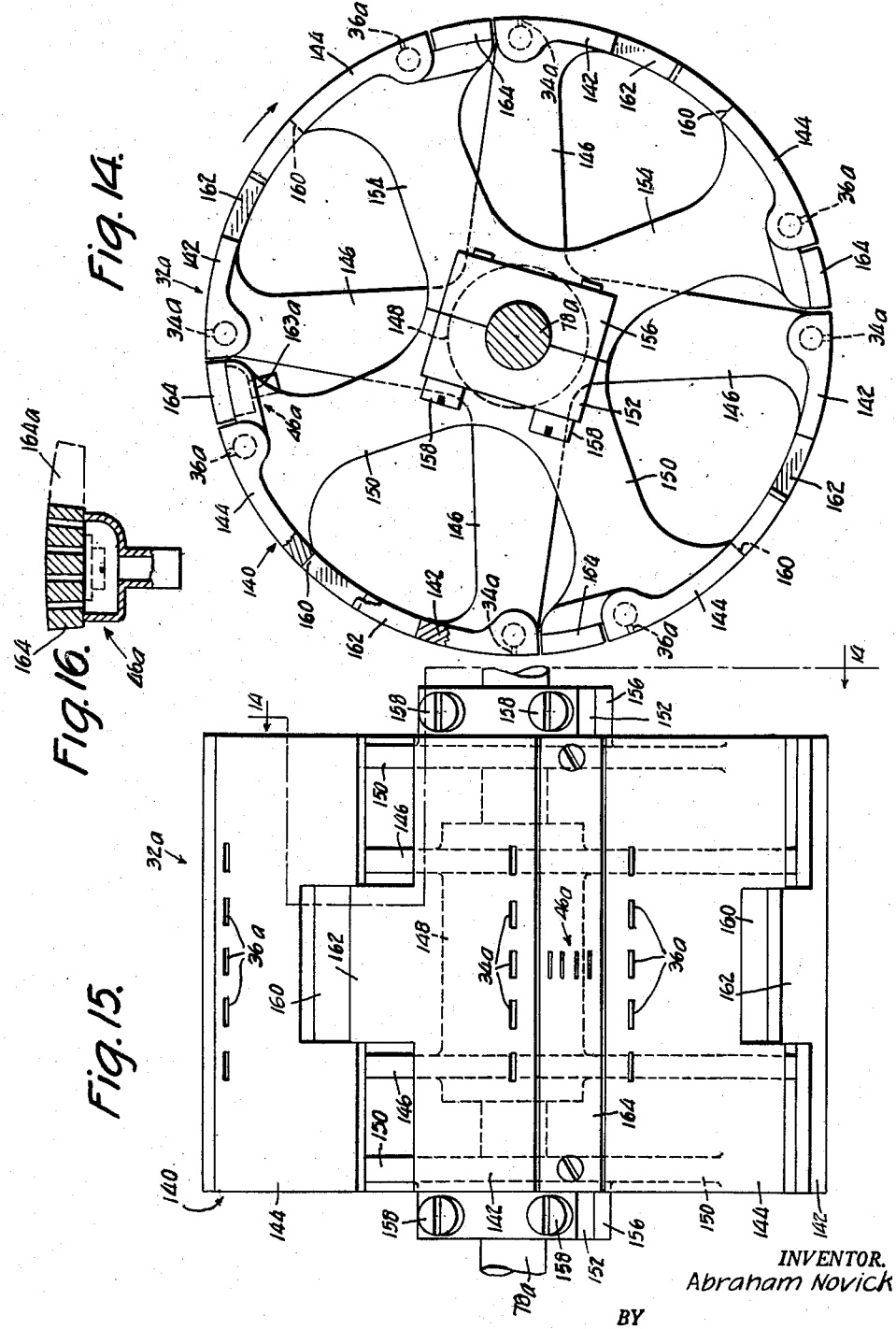

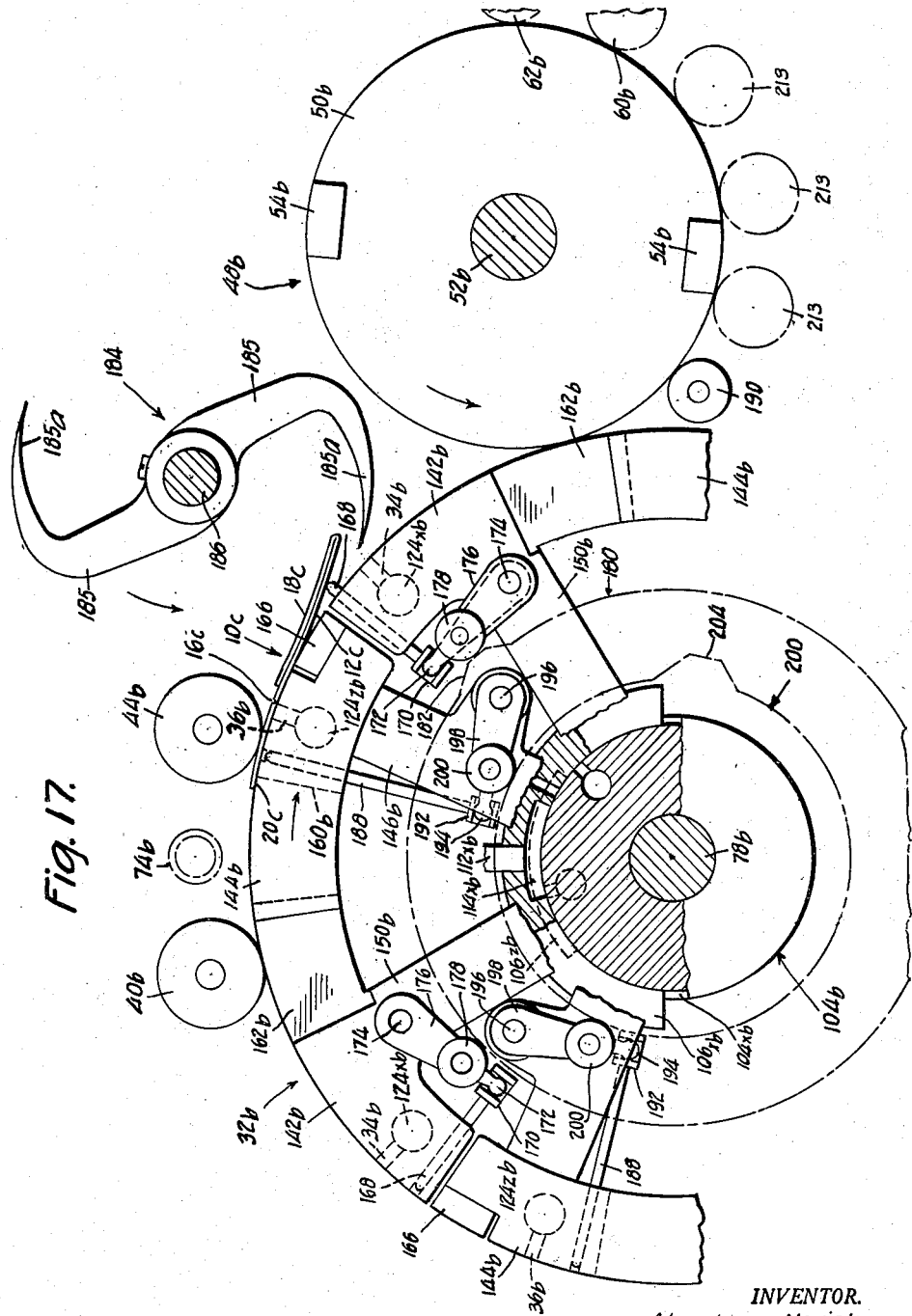

Jan. 7, 1964 A. NOVICK 3,116,668
ROTARY ENVELOPE MACHINE
Original Filed Dec. 21, 1956 14 Sheets-Sheet 10
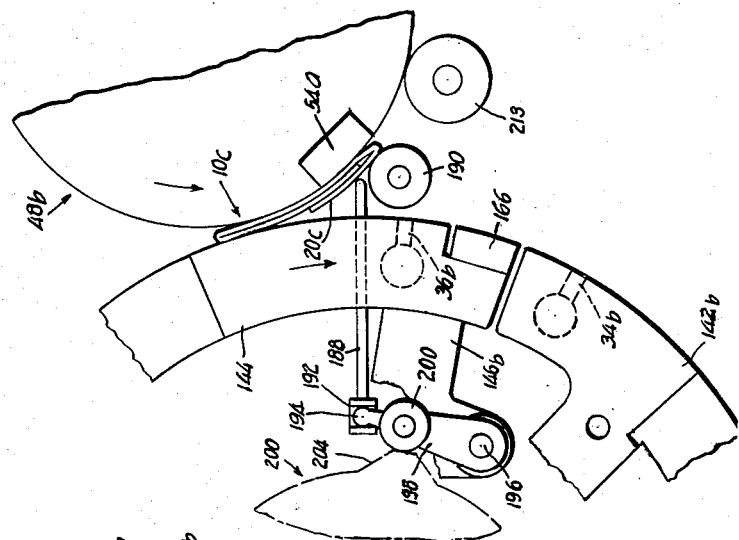
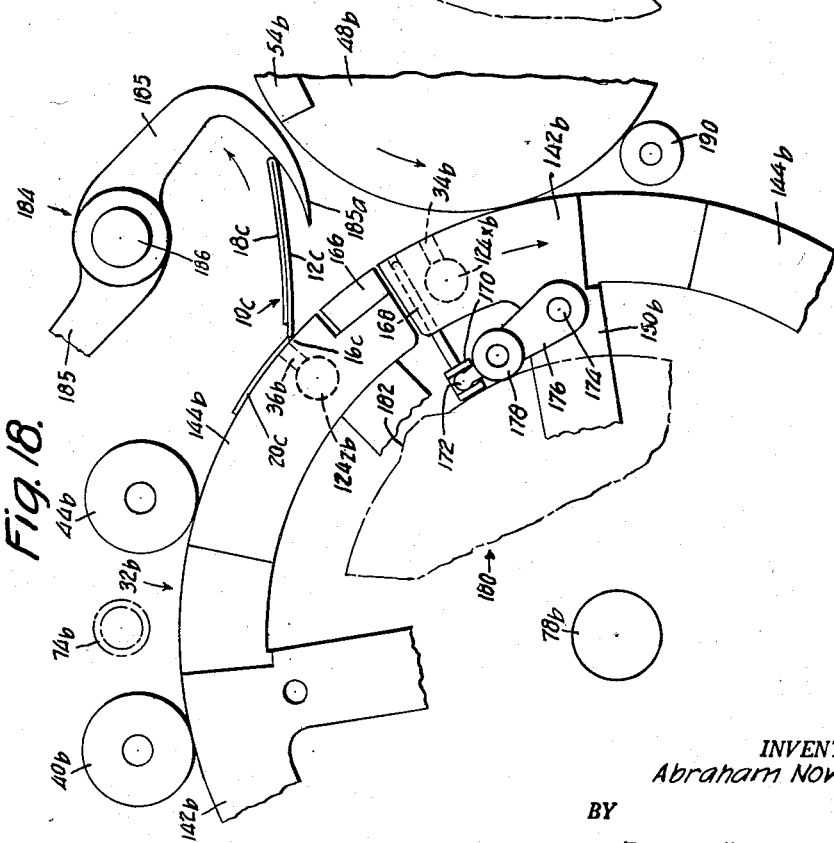
INVENTOR.
Abraham Novick
BY
Moses, Nolte + Nolte
ATTORNEYS

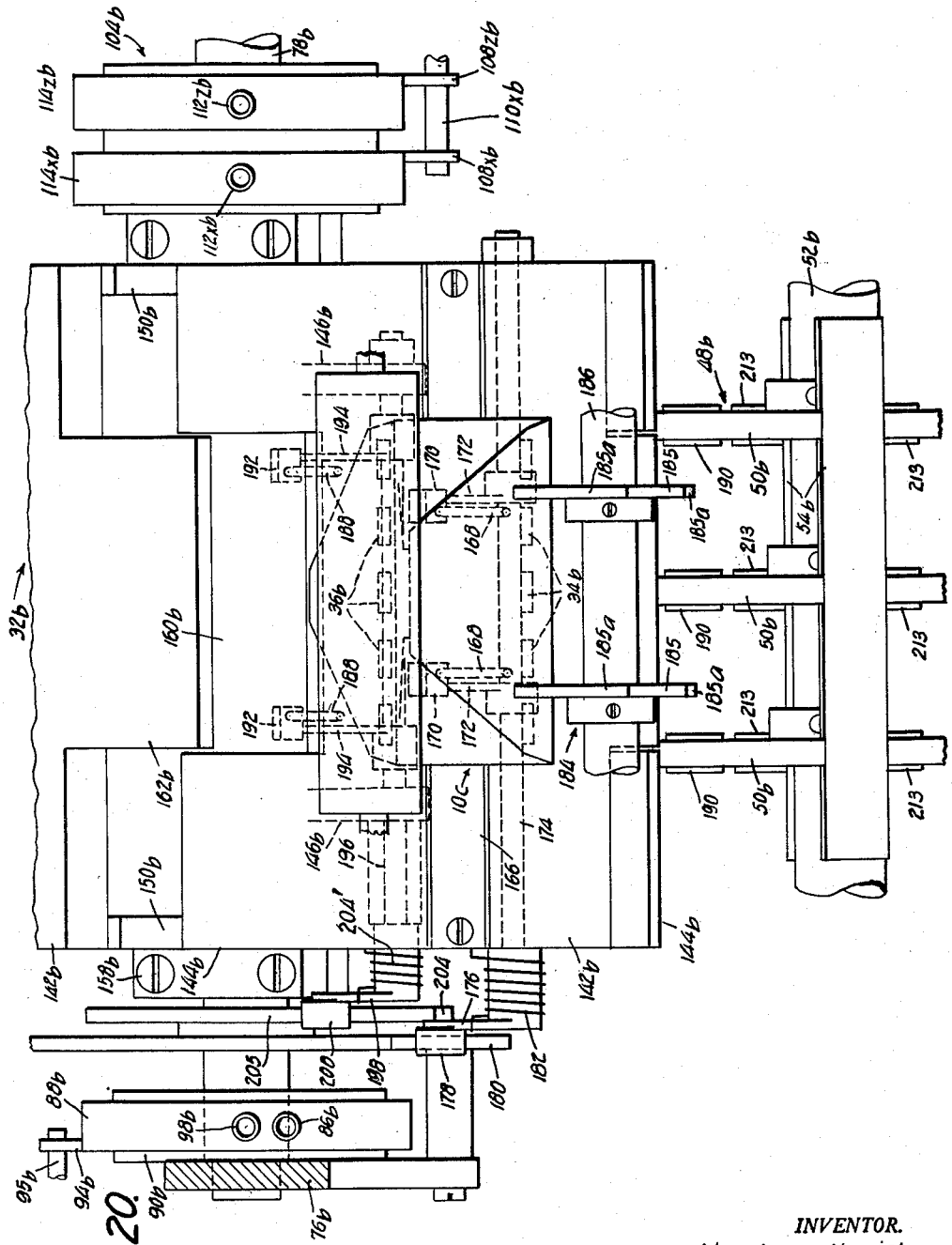

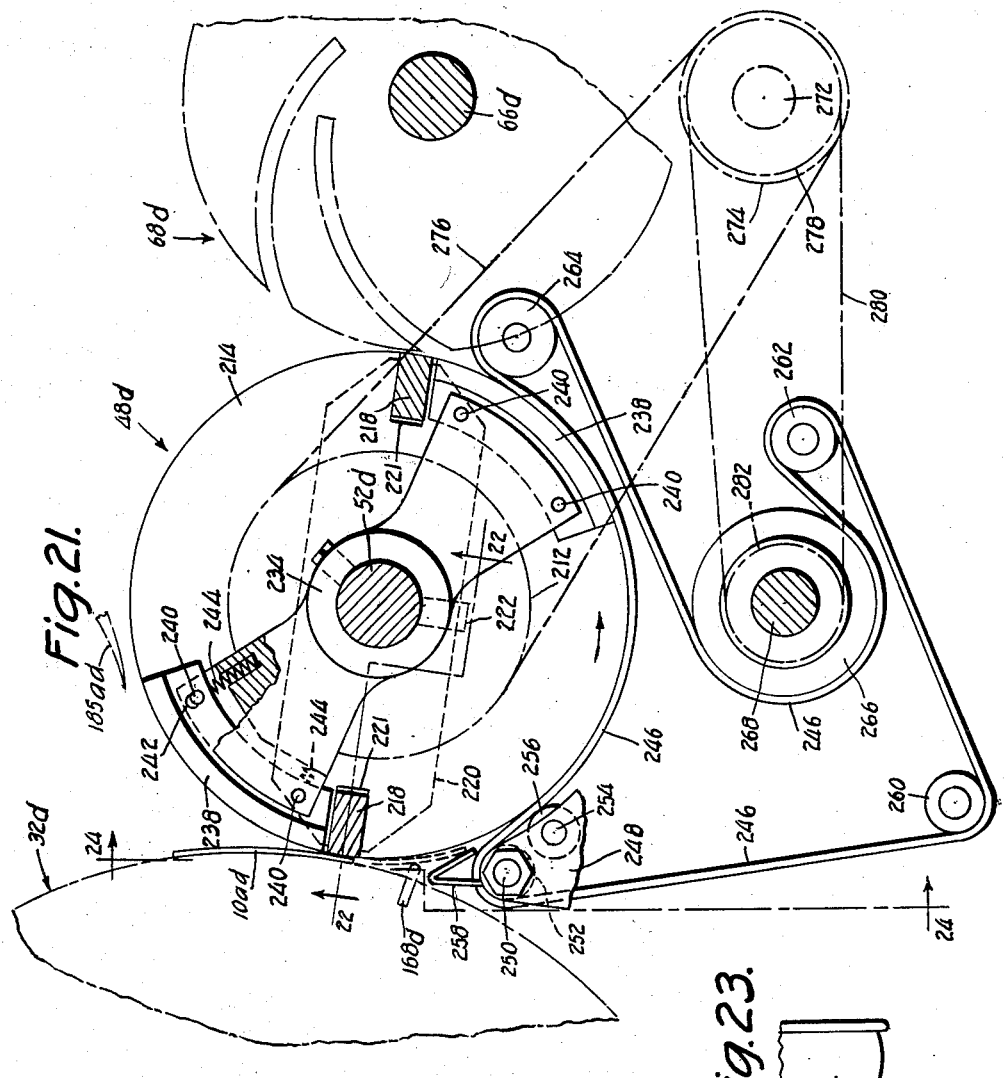
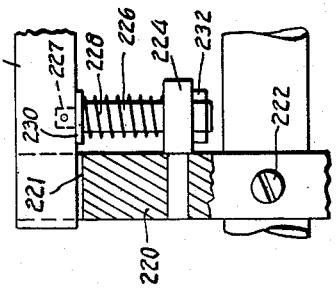

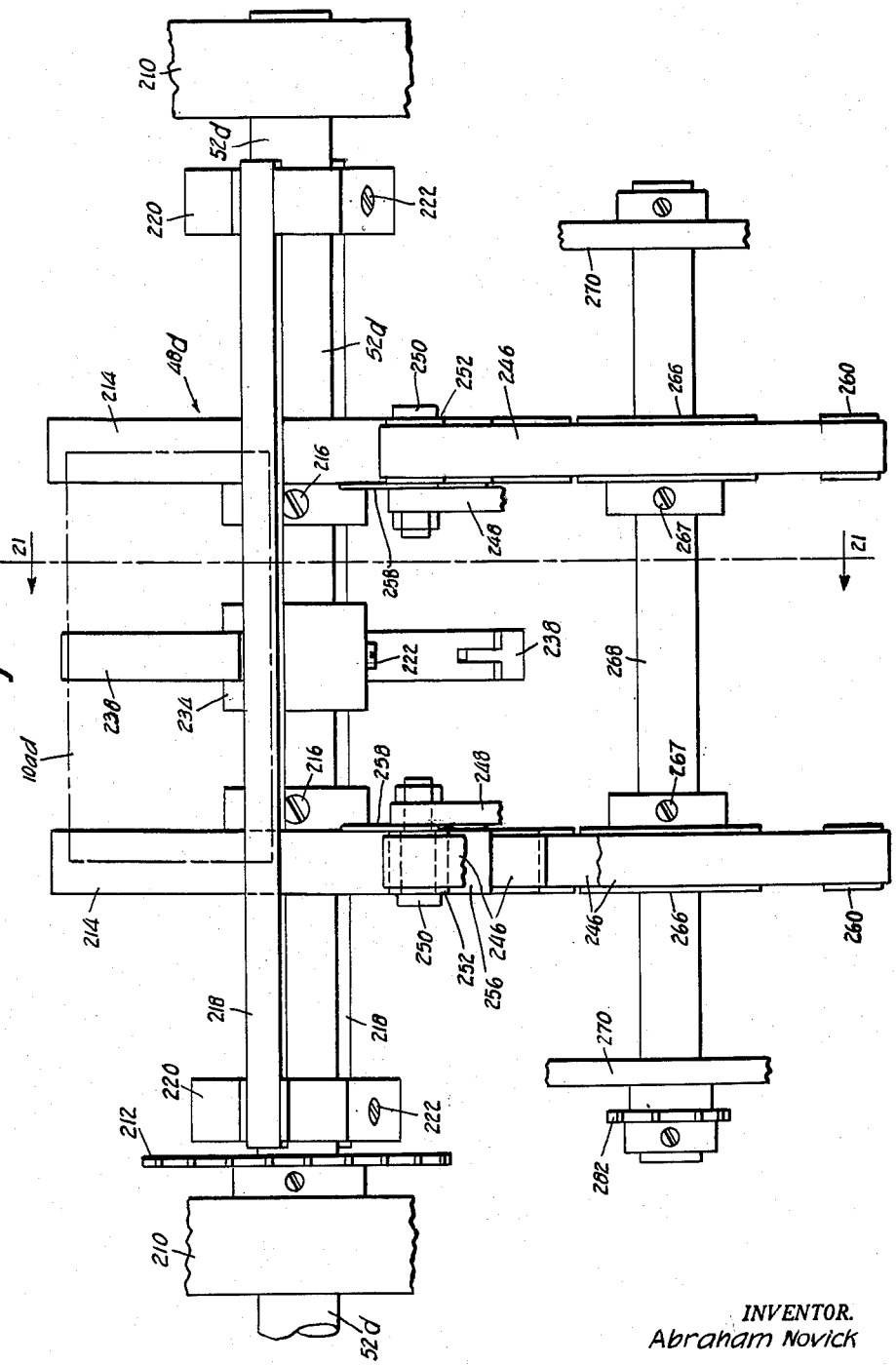

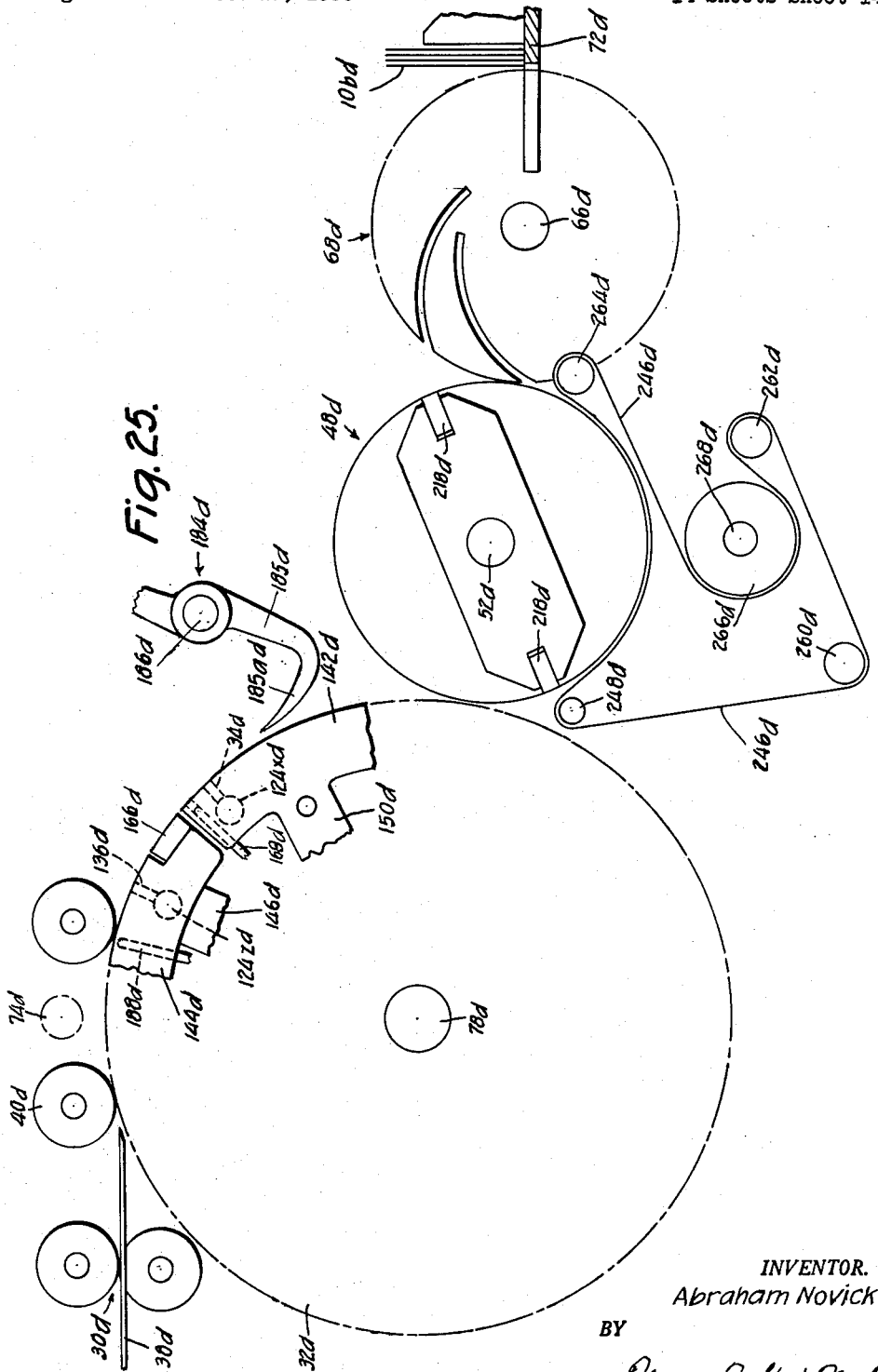

United States Patent Office 3,116,668
Patented Jan. 7, 1964

3,116,668
ROTARY ENVELOPE MACHINE
Abraham Novick, Flushing, N.Y., assignor to F. L. Smithe Machine Co., Inc., New York, N.Y., a corporation of New York
Continuation of application Ser. No. 629,902, Dec. 21, 1956. This application Nov. 15, 1960, Ser. No. 70,872
26 Claims. (Cl. 93—62)

This invention is a continuation of my prior copending application Serial No. 629,902 filed December 21, 1956, now abandoned, and relates to the manufacture of envelopes and more specifically to the final steps performed by so-called high speed rotary envelope machines, consisting of the folding and adhering of the bottom flap, the folding in of the dried seal flap, and the delivery of the finished envelopes one by one into stack formation.

The mechanism for performing these steps in modern envelope making machines has been slow acting relative to most of the other operating mechanisms of the machine, and has been chiefly responsible for imposing a limiting rate of production upon these machines. The slowness of these elements has resulted chiefly from the fact that each of them has involved reciprocatory parts of long sweep and substantial mass, which were so arranged and timed that they had to execute a full reciprocation, including both active and return strokes, in a fraction of a machine cycle.

It is a primary object of the invention to provide means for performing the steps referred to effectively and dependably at a very much increased rate. Mechanism embodying the novel features of the present invention has been caused to achieve an output of finished envelopes at a rate in excess of seven hundred and fifty envelopes per minute.

It is a feature of the present invention, in one form of embodiment, that the operations referred to are achieved through the utilization of parts which operate only in a continuous, rotary manner. In an alternative form of the invention it is a feature that the operations referred to are achieved through the utilization of parts which operate in a continuous, rotary manner in conjunction with simple reciprocatory parts of short stroke and small mass.

It is a feature of the invention that novel bottom flap folding mechanism is provided which includes:

(1) A suction drum onto which scored blanks are fed successively in spaced out relation and in timed relation with the operation of the drum, each with its bottom flap leading, its seal flap trailing, and its end flaps folded inward on top of the body area, said drum having suction means for holding an envelope body in fixed relation to the drum throughout the bottom flap folding operation;

(2) A continuously rotary suction member, timed in its operation to pick up the leading margin of the bottom flap and carry it away from the drum for initiating the fold along the score line which divides the bottom flap from the body as the advance of the blank by the drum is continued; and (3) A continuously rotary pressing roller of comparatively small diameter located to intercept the bottom flap when released by the rotary suction member, complete the folding thereof, and press the bottom flap down against the lining face of the body and the exposed, gummed leading margins of the end flaps for adhesion thereto.

It is a further feature of the invention that mechanism is provided for relatively folding the seal flap and the body, which comprises:

(1) A rotary suction drum (desirably the same one referred to as forming a part of the bottom flap folding mechanism), which includes suction means for engaging the seal flap to hold the seal flap in fixed relation to the drum throughout the relative folding of the body and the seal flap;

(2) Means for deflecting the body of the blank away from the drum to initiate a fold along the score line which divides the seal flap from the envelope body, and to continue the fold through a substantial angle; and (3) An opposed drum (desirably of smaller diameter than the first) disposed to intercept the deflected envelope body, to complete the fold, and to press the envelope body down against the seal flap, and having means for taking over control of the finished envelope and for carrying the envelope away from the first drum after release of the seal flap by the suction means on the first drum.

It is still another feature of the invention that delivery means is provided which comprises:

(1) A constantly rotating drum (which may be and desirably is, the second drum of the seal flap folding means) which includes suction means for engaging each completed envelope near the leading edge of the envelope body and feeding the envelope forward, with the sealing flap folded against the now leading area of the body, to a transfer point;

(2) A comparatively slow running, continuously rotary, slotted carrier disposed to have an envelope thrust upward into each of its slots by the drum as the slots arrive successively in an envelope receiving position, and a stationary horizontal delivery table which extends secant to the slotted carrier at the downgoing side of the carrier, in position to intercept and arrest each blank on the carrier and force it from its slot as the carrier continues its forward motion, so that the blank is discharged onto the table in registry with the blanks on the table which have preceded it. The carrier serves also as means for pushing the stack along the table to the extent of substantially the thickness of a single envelope each time that an envelope is added to the stack.

It is a feature that the suction drum which participates both in the bottom flap folding and in the top flap folding is made of such large diameter that a plurality of envelope manufacturing cycles occur during a single revolution of the drum at the speed of envelope travel. This is advantageous from the standpoint of providing ample room for the two folding operations to follow one another while the envelope is being carried through an upper arc of the drum travel.

Other objects and advantages will hereinafter appear.

In the drawing forming part of this specification.

FIGURE 1 is a view in sectional side elevation of an illustrative combined folding and delivery mechanism embodying one practical and highly advantageous form of the invention, the section being taken on line 1—1 of FIG. 3;

FIGURE 2 is a fragmentary sectional view taken on the line 2—2 of FIGURE 3;

FIGURE 3 is a fragmentary plan view of the mechanism illustrated in FIGURE 1;

FIGURE 4 is a fragmentary view in sectional side elevation, partly broken away, and on a larger scale than FIGURE 1, showing the bottom flap folding operation in progress;

FIGURE 5 is a view generally similar to FIGURE 4, but showing the bottom flap folding operation at a more advanced stage than in FIGURE 4;

FIGURE 6 is a fragmentary detail view, partly broken away, of a blower which is employed in the seal flap folding operation;

FIGURE 10 is a fragmentary view in end elevation, partly broken away, of valve mechanism illustrated in FIGURE 11, the section in the broken away areas being taken on the line 10—10 of FIGURE 11;

FIGURE 11 is a fragmentary view in side elevation, partly broken away, of valve mechanism illustrated in FIGURE 10, the section in the broken away areas being taken on the line 11—11 of FIGURE 10;

FIGURE 12 is a fragmentary sectional view taken upon the line 12—12 of FIGURE 3, looking in the direction of the arrows;

FIGURE 13 is a fragmentary sectional view taken upon the line 13—13 of FIGURE 3, looking in the direction of the arrows;

FIGURE 14 is a view taken on the line 14—14 of FIGURE 15, looking in the direction of the arrows and showing a form of suction drum which comprises relatively adjustable sections for accommodating envelope blanks of different sizes;

FIGURE 15 is a view in elevation of the suction drum of FIGURE 14;

FIGURE 16 is a detail view, partly broken away, of a blower employed in the drum of FIGURES 14 and 15;

FIGURE 17 is a view similar to FIGURE 4 of a modified form of mechanism in which mechanical means is provided for initiating and carrying forward the seal flap folding;

FIGURES 18 and 19 are views generally similar to FIGURE 17 but showing successive stages in the seal flap folding operation;

FIGURE 20 is a fragmentary plan view, partly in section, showing the mechanism of FIGURES 14 to 19;

FIGURE 21 is a fragmentary view in sectional side elevation showing a further modified form of mechanism, the section being taken on the line 21—21 of FIGURE 24 looking in the direction of the arrows;

FIGURE 22 is a fragmentary detail sectional view taken on the line 22—22 of FIGURE 21, looking in the direction of the arrows;

FIGURE 23 is a fragmentary view of a belt guiding and driving pulley employed in the structure of FIGURE 21;

FIGURE 24 is a fragmentary view in elevation of the mechanism shown in full lines in FIGURE 21, the view being taken along the line 24—24 of FIGURE 21 looking in the direction of the arrows; and FIGURE 25 is a comprehensive view, partially diagrammatic, of the form of mechanism disclosed in FIGURES 21 to 24.

Figure 9:
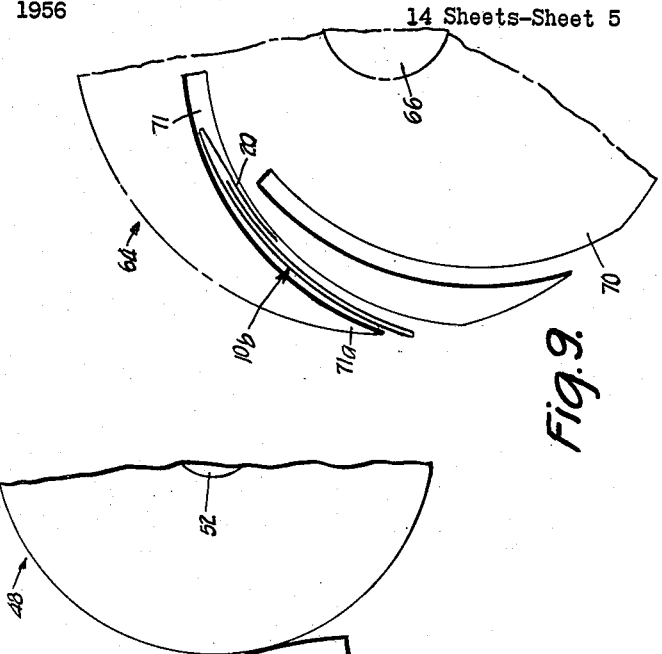
FIGURE 9 is a fragmentary view showing particularly two adjacent slots of the slotted delivery carrier and a folded envelope in one of them.

The illustrative machine of FIGURES 1 to 13, inclusive, comprises the usual rigid, stationary frame structure, portions of which are shown and hereinafter described, upon which the various operating parts are conventionally mounted. The novel mechanism which is illustrated is designed to deal with individualized envelope blanks which have reached the condition of the blank 10, as shown at the left side of FIGURE 3. The blank 10 is shown as comprising a body portion 12 which is divided by transverse score lines 14 and 16, respectively, to form a leading bottom flap portion 18 and a trailing seal or closure flap portion 20. The seal flap portion 20 has dried gum 22 applied to its lining face, which face is uppermost as the blank is shown in FIGURES 1 and 3. End flap portions 24 have already been folded over and in upon the body portion 12 about fold lines 26. The leading margins of the end flap portions 24 have wet gum 28 applied, through which the bottom flap 18 is to be adhered to the end flaps 24 when the bottom flap is subsequently folded over and pressed down against the body portion 12 and the end flaps 24. The folding and pressing of the bottom flap 18 is the first significant operation performed by the mechanism illustrated. The second significant operation is the relative folding of the body portion 12 and the seal flap 20. The third and final significant operation is the depositing and accumulating of the finished envelopes into an orderly stack at a very high rate of delivery.

The blanks, after preliminary operations which are not illustrated, are fed in the condition of the blank 10 in spaced out relation and at very high speed by the rollers of a feed couple 30 onto a drum 32 which continues the blanks forward at the same speed as that at which they arrive. The rollers of the feed couple 30 are very narrow rollers which engage narrow blank margins only, so as to escape contact with the wet gum 28. Although the invention is not limited to a four-up drum, the drum 32 chosen for illustration is designed for four-up operation, it being understood that, for example, a three-up operation is equally desirable. That is to say, the circumference of the drum is equal in extent to the distance that a blank is fed in a plurality of machine cycles (the period of a cycle being the time between the arrival of successive envelope blanks at any selected point in the machine), and the operating mechanisms carried by the drum are repeated as many times as the number of cycles executed in a single revolution of the drum. Each blank is operated upon by only one of these sets of mechanisms. It follows that each of the mechanisms carried by the drum is called upon to act only once in a full revolution of the drum.

The drum 32, as shown, is provided with four lines of suction openings 34, each designed to engage the leading margin of the outer or lower face of the body portion 12 of a blank adjacent the score line 14, and four lines of suction openings 36, each designed to engage the leading margin of the outer or lower face of the seal flap 20 of a blank adjacent the score line 16 as in FIGURE 5. Suitable provision is made for supplying and controlling suction to the passages 34 and 36, as will be brought out more fully at a subsequent point.

Each blank is fed onto the drum across a table 38 and beneath positively acting narrow feed rollers 40, which bear against the drum directly or through the narrow, ungummed blank margins, and is so timed in its arrival that the leading margin of the body portion 12 covers the suction passages of a row 34, as in FIGS. 1 and 4. The suction is caused to come on in the passages 34 at or just before the time when the passages reach the blank engaging position adjacent the feed rollers 40.

At the same time the leading margin of the bottom flap 18 is engaged by a suction segment or tube 42 which is rotatively driven in a path substantially tangent to the drum 32 and at a peripheral speed equal to the peripheral speed of the drum. The segment 42 is of such small radius that it is required to make two complete revolutions during each cycle of the machine. Since alternate revolutions of the segment 42 are active and the other alternate revolutions should be inactive, the furnishing of suction to the segment 42 is controlled to occur only in those revolutions in which the segment is scheduled to engage the leading margin of a bottom flap 18. The segment 42 picks up the leading margin of the bottom flap 18 in the full line position shown in FIGURES 1 and 4, deflects the flap 18 away from the drum 32, thereby initiating the folding of the bottom flap about the score line 14, and carries forward the folding until the parts of the mechanism and of the blank are in the positions illustrated in broken lines at 42a and 18a in FIGURE 4. At that point the suction in the segment 42 is discontinued, so that the bottom flap 18 is released by 42.

After the release of the bottom flap 18 by the segment 42, the bottom flap tends to spring upward and forward as in FIG. 5. It is intercepted by a pressing roller (see FIG. 3 also), which acts to continue the folding of the bottom flap 18 and then presses it down against the body portion 12 and against the wet, gummed margins of the end flaps 24.

It is evident that there is a critical point past which the bottom flap 18 must be carried by the segment 42 if the fold is to be completed about the score line 14. If the flap 18 were deflected only a very short distance and then released, it might simply fall back against the drum and pass in a flat condition into the nip of the pressing roller 44 and the drum 32. If it were carried somewhat farther, but not past the critical point, a fold would be formed but it would not be formed in the desired location nor in the manner intended.

The roller 44, like the segment 42, is of small radius. These radii have an important bearing upon the location of the critical point and the ability of the segment to carry the bottom flap through the critical point in a comparatively brief period of operation. Because the roller 44 is of such small radius the bottom flap is quickly carried outward farther than the center of the roller so that when it springs outward and forward it will be intercepted by, and will not push in underneath the roller in a condition to be folded irregularly. The flap 18 is shown in FIGURE 5 in the act of being intercepted by the roller 44. When intercepted in a position like that shown, the flap 18 will be folded down and fed into the nip of the roller 44 in the manner intended.

It should be noted also that the fact that the suction member 42 is a mere segment and not a complete cylinder is important in the successful carrying out of the folding action. The fact that the member 42 is segmental leaves room for the blank to bend along the score line 14 as shown, and not merely to wrap around a cylindrical surface.

Figure 7:
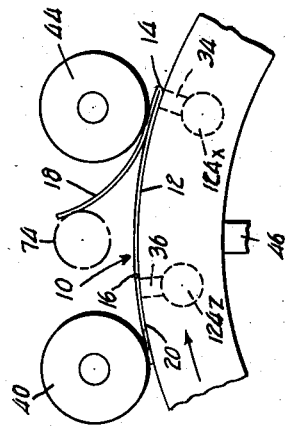
FIGURE 7 is a fragmentary detail view showing the final stage of the bottom flap folding.

In FIGURE 7 the blank has entered the nip of the roller 44 and the pressing action is in progress. At this point the suction effect is no longer required in the passages 34 and the suction is cut off. This is an important step in preparation for the folding over of the body 12 onto the seal flap 20, because it releases the body for such folding.

Figure 8:
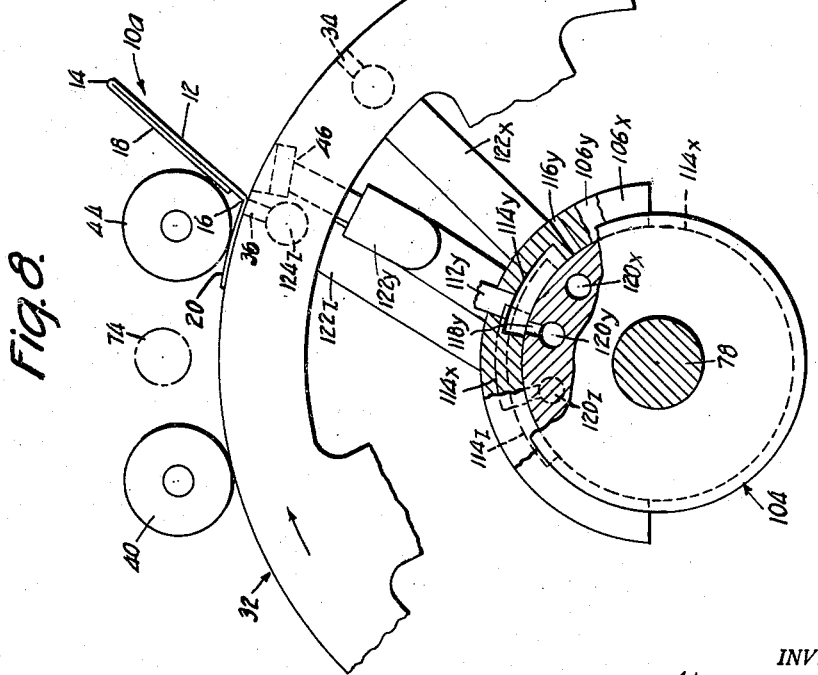
FIGURE 8 is a view similar to FIGURE 4 but showing the bottom flap folding completed and the seal flap folding in progress.

Shortly prior to the attainment of the position illustrated in FIGURE 8, suction is applied in the passage 36 for the purpose of securing the leading margin of the seal flap 20 adjacent the score line 16 in a fixed relation to the drum. A short time after the suction in the passages 36 has become effective, a blower 46, which is carried by the drum 32 just in advance of the passages 36, is rendered active by the supplying of air under pressure to the blower. The blower deflects the body of the blank 10 away from the drum 32, as seen in FIGURE 8. As the blank and the drum continue forward together with the blower active, the blank approaches a second drum 48 in the condition of the blank 10a illustrated in FIGURE 1. The drum 48 intercepts the body of the blank and continues the folding of it about the score line 16 as the score line approaches the nip formed by the two drums 32 and 48. A preceding blank 10b is shown in FIGURE 5 as having entered the nip of the drums 32 and 48. This completes the manufacture of the envelope, and there remains only the necessity of discharging the envelope, along with those which precede and follow it, in neat and orderly fashion.

The drum 32 is continuous on its surface both axially and circumferentially. The drum 48, on the other hand, is not continuous in either direction. It is adequate, nevertheless, for intercepting and pressing the blank and for taking over control of the blank from the drum 32 and conducting the blank away. The drum 48 is composed of three axially spaced discs 50 (FIGS. 3 and 5) which are made fast on a shaft 52, and two diametrically opposed suction and pressing bars 54. The drum 48 represents a two-up arrangement, there being two envelopes received and two envelopes discharged for each revolution of the drum. It is for that reason that two of the combined suction and pressing bars 54 are provided.

At substantially the point illustrated in FIGURE 5, the suction in the passages of the row 36 is discontinued and atmospheric air is admitted, and at the same time suction is applied in the passages 56 of the bar 54 which is shown pressed against the blank 10b. This assures that the envelope will be carried away from the nip by the drum 48 rather than the drum 32. The envelope is caused by the suction to travel into the space between the drum 48 and stationary concave guide members 58 which are complementary to the drum 48 and are located closely adjacent to the discs 50 of the drum throughout a substantial arc.

Beyond the guide members 58, successive spring biased rollers 60 and 62 coact with the two outer discs 50 of the drum 48 to feed the envelope forward at the same constant speed at which it was advanced by the feed couple 30 and by the drum 32. As the envelope enters the nip of the rollers 62 the suction is cut off in passages 56 and atmospheric air is admitted.

A rotary slotted envelope carrier 64 (FIGS. 1 and 3) runs substantially tangent to the drum 48 at a point above the point of tangency of the rollers 62. As shown, the axis of the shaft 66 which forms part of the slotted carrier and supports and drives the other parts thereof is located substantially above the horizontal plane of the axis of the shaft 52 upon which the drum 48 is mounted. The axis of the bearings 68, however, upon which the rollers 62 are carried, is shown as disposed in the horizontal plane of the axis of the shaft 52. With this arrangement the envelopes emerge vertically from the nip of the drum 48 and the rollers 62, while the slotted carrier is disposed to extend across the vertical feed plane into position to have its slots receive the envelopes one after another.

The slotted carrier 64 comprises the driven shaft 66 and three slotted discs 70 made fast upon it. Each disc, as shown, has ten slots 71 and is intended to receive and deliver ten envelopes per revolution. The shaft 66 is driven at the rate of one revolution in each ten cycles. Each of the ten pockets formed by corresponding slots of the discs is arranged to arrive in envelope receiving position through continuous rotation of the carrier, as an envelope is brought to the transfer station by the drum 48 and the rollers 52. Each envelope is thrust into its assigned pocket at high speed, but is braked by the walls of the curved slots which form the pocket. Each slot forms a segment of a spiral, so that it exerts a progressively increasing braking action as the envelope penetrates more deeply into the discs. Each envelope is thrust substantially fully into the slots, but it is not essential that this full depth insertion be effected with precision or uniformity, because irregularity in this respect will not adversely affect the regular disposition of the envelopes as finally discharged. Each folded envelope 10b enters a slot unobstructedly, as in FIGURE 9, with its top edge, located at the junction of the body and the seal flap, leading. There is no tendency, therefore, for the free edge of the seal flap to snag on a portion 71 of the wheels 64 and become unfolded or rumpled.

A stationary delivery table 72, which is desirably horizontal, and is so shown, extends secant to the carrier 64, being slotted at its receiving end so that it may receive the margins of the discs 70 at the downgoing side of the carrier, and stand in position to intercept the leading edge of each envelope, arrest the envelope, and force it from its pocket as the carrier 64 continues its rotation relative to the arrested envelope. Even after an envelope has been engaged by the table it is frictionally urged downward by the carrier 64 so that all portions of its lower edge are pressed against the table. The envelope is thus registered accurately with the accumulated envelopes which have preceded it. As each envelope is added to the stack, the stack is pushed along the table by the carrier to the extent of the thickness of the added blank.

This completes the operation of the mechanism illustrated in FIGURES 1 to 13. In order to avoid digression, however, the details of the mechanism for controlling the suction and blower devices have been passed over up to this point. A description of these and some other details will now be given.

The suction segment 42 is made fast upon a hollow shaft (FIGS. 3 and 12) with which it communicates. The shaft 74 is rotatively supported in a stationary frame member 76, which member also supports the supporting and driving shaft 78 of the drum 32. The drive shaft 78, through suitable gearing (not shown), drives the shaft 74 at eight times its own rotary speed, causing the peripheral linear speed of the segment 42 to be equal to that of the drum 32.

A stationary chest 80, carried by the frame member 76, surrounds the shaft 74 and communicates with the interior of the shaft through passages 82 formed in the tubular shaft (see FIGURES 3, 12 and 13). Suction is intermittently supplied to the segment 42 through the chest 80 and the shaft 74 by means of a flexible tube 84. The flexible tube 84 is attached to a nipple 86 which extends through a stationary valve member 88. The valve member 88 is substantially semi-circular in form. It rests upon a rotary valve member 90 which is continuously driven by, and in unison with, the shaft 78. The valve member 88 rests in a circumferential channel 92 of the valve member 90 and includes a slotted ear 94 which embraces a stationary stud 95 for preventing rotation of the valve member 88.

A second flexible tube 96 is directly connected at one end to a source of suction (not shown) and at its opposite end to a second nipple 98 which passes through the valve member 88. Since the shaft 78 turns through ninety degrees in each cycle of the machine, each quadrant of the valve member 90 corresponds to one complete cycle. Each quadrant is provided with a recess 100 for placing the nipple 86 in communication with the nipple 98 to produce suction in the segment 42 as soon as the bottom flap 18 reaches the position shown in full lines in FIGS. 4 and 12, and thereby to cause the bottom flap to be gripped at its leading margin. Following the recess is a notch 102 which is open to the atmosphere for admitting atmospheric air to the nipple 86 and hence to the segment 42 to release the blank approximately when the segment 42 reaches the broken line position 42a of FIG. 4. As will be apparent from an examination of FIGURE 13, the nipple 86 is connected with the source of suction for somewhat more than one-quarter of a cycle, and is cut off from the source of suction throughout the remainder of each cycle, i.e., for a little less than a revolution and a half.

In describing the connections to the suction passages 34, the blower 46 and the suction passages 36, the subscript $x$ will be used in connection with those passages and connections which particularly affect the passages 34; the subscript $y$ will be used in connection with those passages and connections which particularly affect the blower 46; and the subscript $z$ will be used in connection with those passages and connections which particularly affect the passages 36.

A rotary valve member 104 (FIGS. 1, 3, 10 and 11), common to the passages 34 and 36 and to the blower 46, is mounted on the shaft 78 and compelled to rotate in unison with the shaft so that one-quarter turn of the valve member 104 corresponds to a full cycle of the machine. The valve member 104 is formed with three circumferential channels 104x, 104y and 104z, in which separate stationary valve members 106x, 106y and 106z are seated. The stationary members are provided, respectively, with slotted ears 108x, 108y and 108z, each of which embraces a stationary rod 110 for preventing rotation of the respective members. The stationary valve members 106x and 106z (FIGS. 10 and 11) are connected with a source of suction through tubes 112x and 112z which extend through the respective members 106x and 106z. The stationary valve member 106y is connected with a source of air under pressure through a tube 112y, which tube extends through the member 106y.

The tube 112x communicates with a recess 114x in the valve member 106x; the tube 112y communicates with a recess 114y in the valve member 106y; and the tube 112z communicates with a recess 114z in the valve member 106z. The valves 106x, 106y and 106z are also provided, respectively, with passages 116x, 116y and 116z (FIG. 11) which extend through the valve members to the atmosphere. The valve member 104 is formed with four passages 118x, each of which traverses the recesses 114x and the atmospheric passages 116x once in each four cycles. The valve member 104 is also formed with four passages 118y, each of which traverses the recesses 114y and the atmospheric passage 116y once in each four cycles. The valve member 104 is also formed with four passages 118z, each of which traverses the recesses 114z and the atmospheric passage 116z once in each four cycles. Each of the passages 118x is connected through an axially extending passage 120 formed in the valve member 104, with a flexible tube 112x, and thence through an axially extending passage 124x of the drum 32 with one row of the suction passages 34. Each of the passages 118y is connected through an axially extending passage 120y formed in the valve member 104 with a flexible tube 122y and thence through a passage 124y of the drum with the blower 46.

Each of the passages 118z is connected through an axially extending passage 120z formed in the valve member 104, with a flexible tube 112z, and thence through an axially extending passage 124z of the drum with one row of the suction passages 36.

The recesses 114x, 114y and 114z, and the atmospheric passages 116x, 116y and 116z are properly located and extended to cause the suction passages 34 and 36 and the blowers 46 to be operated in the manner previously described.

The mechanism for controlling the suction passages 56 of the combined suction and pressing bars 54 of the drum 48 is shown in FIGURES 1, 2 and 3. A stationary valve member 126 rests in a circumferential channel 128 of a rotary valve member 130 which is fast on the shaft 52. The valve member 126 includes a slotted ear 132 which embraces a stationary rod 134 to prevent rotation of the valve member 126. A tube 136 which is directly connected with a source of suction (not shown) extends through the valve member 126 and communicates with a recess 137 which is formed in said valve member. The rotary valve member 130 includes two diametrically opposite passages 138 which traverse the recess 137 and then pass beyond the valve member 126 for free communication with the atmosphere. Each passage 138 is connected through a lateral passage 140 and a tube 142 with a passage 143 in one of the bars 54 and thence with the passages 56 in said bar. Thus the passages 56 of the two bars are alternately placed in communication with the atmosphere and with the source of suction. The tubes 142 are carried halfway around the shaft 52 so that the passage 138 of the valve member 130, which is traversing the upper half of its orbit and is, therefore, in communication with the source of suction, will apply suction to the passages 56 which are traversing the lower half of their orbit. In each set of passages 56 the suction is on for approximately one-half revolution of the drum 48 and is off for the remainder of the revolution.

The machine of FIGURES 14 to 16 is generally like the machine of FIGURES 1 to 13, but for the drum 32 there is substituted a drum 140 which is made in circumferentially adjustable suctions in order to provide a desired adjustment for the making of envelopes of different heights. If the rows of suction openings 34 and 36 are at a fixed distance from one another and are to engage the extreme leading margins of the body portion 12 and the seal flap portion 20, it is evident that the machine will be confined to the making of envelopes of just one body height. Actually the machine of FIGURES 1 to 13 affords some latitude because it is not absolutely essential that the extreme forward margins of the envelope parts referred to be engaged by the suction means. Such engagement does not, however, represent the optimum condition.

In FIGURES 14 and 15 the drum 140 consists of four identical segments 142 and four identical segments 144, the segments 142 and 144 being disposed in alternation.

Each segment 142 carries a row 34a of suction passages at its rear extremity and each segment 144 carries a blower 46a at its forward extremity with a row 36a of suction passages immediately behind the blower. The segments 142 are unitary with supporting arms 146 which extend outward from a common hub 148, fast on the shaft 78a. Two of the segments 144 are unitary at each end with supporting arms 150. The arms 150 at each end are connected to one another through a hub segment 152. The other two segments 144 are unitary at each end with similar arms 154. The arms 154 at each end are connected to one another through a hub segment 156. The hub segments at each end may be fixedly clamped to the shaft 78a by headed screws 158. The shank of each screw 158 is passed freely through a hub segment 152 and threaded into a hub segment 156. When relative adjustment is desired, the screws 158 are partially backed out, the segments 144 are adjusted as a unit relative to the shaft and relative to the segments 142, and the screws 158 are re-tightened. Each segment 144 has a notch 160 formed in its rear end, and each segment 142 has a protruding tongue 162 which is adapted to fit adjustably in the notch of the neighboring segment 144.

As the parts are shown in FIGURES 14 and 15, they are set for operating upon blanks of minimum height. Each blower 46a is secured to a block portion 164 which is fitted and secured to the associated segment 144 in a receiving pocket formed by lugs 163a located at the forward extremity of the segment. When the machine is to be adjusted for operating upon blanks of greater height the block portion of minimum width is removed and another one with a blower 46a thereon substituted, the surface of the substituted filler block portion 164 being of greater width. The extended portion of the filler block needs not be perforated because it is required, not to increase the blower capacity, but to avoid the occurrence of a gap in the area where the roller 44 acts to press down the bottom flap against the body portion 12 and the gummed end flaps 24 of the envelope blank.

Blowers having filler block portions 164 of various widths are provided so that blanks of various heights can be operated upon. The successive filler block portions would extend by degrees farther and farther into the dotted line area designated 164a in FIGURE 16.

In FIGURES 17 to 20 the construction is generally like that of FIGURES 14 and 15, save that mechanical pushers are substituted for blowers as the means for deflecting the body portion of the envelope away from the drum, solid filler blocks 166 are substituted in place of the blowers, a rotary mechanical transfer member is provided for guiding the leading end of the body portion of the envelope across the space between the two drums and into position to be intercepted by the second drum, and the suction means on the second drum is dispensed with.

The drum 32b is composed of segments 142b and 144b which correspond to segments 142 and 144 of FIGURES 14 and 15, and which are relatively adjustable in the same manner. Suction passages 34b and 36b are provided the same as before, and means similar to those already described in detail are provided for controlling the supply of suction and of atmospheric air to these passages. Since the blowers are not present the means previously described for controlling the supply of air under pressure to the blowers are, of course, not present.

Each of the segments 142b is made to carry a pair of thrust rods 168 and operating means therefor, effective to deflect the leading end of the blank away from the drum 32b (FIG. 17) at an appropriate point in the blank travel. The rods 168 are guided for radial movements by radial bores which are formed in the peripheral portions of the segments 142b. The rods 168 have fixed upon their inner ends channeled heads 170, into the channels of which the free ends of operating cranks 172 are fitted. The cranks 172 are fast upon a rock shaft 174 which is rockably mounted in the segment 142b. Each rock shaft 174 has fast upon its end an operating arm 176 which carries a follower roller 178. The roller runs upon the periphery of a stationary cam 180. The roller 178 is constantly urged toward engagement with the cam by a coil spring 182 which surrounds the hub of the arm 176, and engages the segment 142b at one of its ends and the arm 176 at the other.

The cam 180 is generally circular in shape and its normal radius is such that the rods 168 may be retracted within the circumference of the drum 132b. At one point, however, the cam is formed with a hump 182 which causes the rods 168 to be projected outward. The effect of this is to deflect the envelope body away from the drum as shown in FIGURE 17.

The rods 168 do not throw the envelope body 12c and the folded bottom flap 18c outward as far as the critical point (FIG. 17), but a mechanical transfer member 184 takes over to carry the leading end of the envelope body across the space between the drum 32b and the drum 48b. The transfer member 184 is of substantially the same radius as the drum 48b, and comprises a pair of two-armed members 185, the members being made fast upon a shaft 186 in identical angular positions on the shaft, and being driven counter-clockwise at the same rotary speed (one revolution in two machine cycles) as the shaft 52b which drives the drum 48b. Peripheral or curved portions 185a of the members 185, therefore, travel at substantially the speed of the envelope blank. Each member 185 is made S-shaped. The members 185 are so timed that they present a retreating open mouth to the deflected envelope body as shown in FIG. 17. The arrangement is such that the leading end of the blank body enters the mouth and rides on the lower curved portions 185a of the members 185. The body part of the envelope is turned farther and farther about the score line 16a until the portions 185a pass beyond the reach of the blank body. By that time the blank body has passed through the critical point and is in a position to be intercepted by the drum 48b, and to be finally folded and pressed in orderly fashion about the score line as intended.

The drum 48b is not provided with combined suction and pressing bars, but only with solid pressing bars 54b, although in other respects the drum 48b is of the same construction as the drum 48. For assuring transfer of the envelopes from the drum 32b onto the drum 48b, thrust rods 188 are provided on the segments 114b for guiding the envelopes into the nip of the drum 48b and opposed narrow spring biased feed rollers 190. The thrust rods 188 are guided for radial movement by radial bores formed in the peripheral portions of the segments 144b.

The operating mechanisms for the rods 188 are very similar to the mechanisms which operate the rods 168. Each rod 188 has fast upon its a channeled head 192 into which is fitted the free end of an operating arm 194. The arms 194 of each set are fast on a rock shaft 196 which is mounted in the segment 144b. Each rock shaft also has fast upon it an actuating arm 198. Each arm 198 carries a follower roller 200. All of the rollers 200 ride upon a stationary cam 202. The cam 202 is generally circular and is of small enough normal radius to permit retraction of the rods 188 within the periphery of the drum 32b, as shown in FIG. 17. The cam 202 is provided with a single hump 204 for projecting each rod 188 outward at the appropriate time to cause it to effect the tucking action illustrated in FIG. 19. The recovery by each set of rods 188 to their retracted position is assisted by a return spring 204'.

The rods 168 can, if necessary, cut through the body of the drum 48b, but because they are out of line with the axially spaced discs 52b (FIG. 20) and are out of time with the pressing bars 54b no interference can result. Both the rods 168 and 188 run out of line with the narrow spring biased rollers 190, and the rods 188 which project farther out than the rods 168 are actuated later and also run out of line with the rollers 190.

A series of feed rolls 213 is provided for cooperating with the drum 48b in feeding the folded envelopes to a slotted carrier as shown and described in, and in connection with, FIGS. 1 to 13.

With the exception of the parts referred to above the machine of FIGS. 17 to 20 is a duplicate of the machine of FIGS. 1 to 13, as modified in FIGS. 14 and 15. Corresponding reference characters have accordingly been applied to corresponding machine parts with the subscript b added in each instance, and corresponding reference characters have been applied to the envelope parts with the subscript c added. No further detailed description will be given.

In FIGS. 21 to 25 disclosure is made of a further modified form of mechanism embodying the invention.

The illustrative drum 32c is a duplicate of the drum 32b of FIGS. 17 to 20. Corresponding reference characters have been applied to corresponding parts with the subscript d substituted or added, and no detailed description will be given.

The illustrative transfer device 184d, FIG. 25, is the same as the device 184. The transfer drum 48d and associated guide means are considerably altered, however, as compared with the earlier showing.

A shaft 52d is rotatably supported in side frame members 210, being driven through a sprocket 212 which is fast on the shaft. The drum 48d is constituted in part by a pair of discs or pulleys 214 which are mounted on the shaft 52d with capacity for adjustment relative thereto, being secured to the shaft by set screws 216. The discs 214 are formed with notches through which presser bars 218 extend. The outer faces of the presser bars are substantially flush with the circumferential faces of the discs 214, but the presser bars are mounted independently of the discs so that the discs may be axially adjusted relative to the bars. The bars 218 are mounted upon a pair of blocks 220 which are adjustably secured for rotation in unison with the shaft 52c by means of set screws 222.

The blocks 220, as seen in FIG. 22, are formed with notches 221 which slidingly receive the ends of the bars 218. Provision is made for limiting outward movement of the bars but for permitting the bars to yield inward to a limited extent, as required. Each block 220 has fixed therein, in association with each bar 218, the shank of a flat eye member 224. A pin 226 is passed through each eye member 224 and has a reduced outer end portion 227 pinned in the associated bar 218. The pin 226 is surrounded between the eye member 224 and the bar 218 by a compression coil spring 228 and a washer 230. Each spring 228 bears at its outer end against the washer 230 at its inner end against the associated eye member 224, the springs associated with a single bar serving to urge the opposite ends of the bar outward away from the shaft 52c. A nut 232, threaded on the inner end of each pin 226, bears adjustably against the inner face of the eye member 224 to limit outward movement of the associated bar 218.

Midway between the discs 214 a two-armed block 234 is adjustably secured upon the shaft 52c by means of a set screw 236. The block 234 carries two pressing and feeding shoes 238 which are disposed to follow closely the respective presser bars 218. Pins 240, carried by the block 234 in fixed relation thereto, extend into slots 242 of the shoes 238 for limiting outward movement of the shoes. Compression coil springs 244 which are lodged in bores of the block 234 bear outward against the leading and trailing margins of the shoes for urging the shoes yieldingly outward.

Narrow driven belts 246 are arranged to cooperate with the discs 214 in guiding and feeding the envelopes from the drum 32c to the delivery mechanism 68c. Stationary brackets 248 support bearing pins 250 upon which guide rollers 252 are rotatively mounted, and bearing pins 254 upon which guide rollers 256 are rotatively mounted. The brackets 248 also support fixed guide wires 258 which assist the pins 168c in separating the envelopes from the drum 32c and directing them to the drum 48c and the belts 246. The belts 246 are also threaded upon additional guide rolls 260, 262, 264 and flanged drive pulleys 266. The brackets 248 and the guide rolls for the belts 246 are all mounted with provision for adjustment transversely of the machine. The drive pulleys 266 are adjustably secured by set screws 267 upon a driven shaft 268 which is mounted in fixed frame members 270. A shaft 272 has fast upon it a sprocket 274 which is connected through a chain 276 with the sprocket 212 on drive shaft 52c. The shaft 272 also has fast upon it a sprocket 278 which acts through a chain 280 and a sprocket 282, fast on the shaft 268, to drive said shaft.

The sprocket ratios are such that the belts 246 are caused to travel at the peripheral linear speed of the drum 48c. The fact that the belts 246 are driven in harmony with the drum 48c assures the maintenance of the correct timing and alignment of the envelopes as they are carried forward to the delivery wheels 68c. This result is promoted by the long wrap of the belts about the driving and guiding pulleys 266, brought about by the location of the guide rolls 262.

As shown in FIGS. 21 and 25, the shaft 66d is disposed below the level of the shaft 52d, the purpose being to permit the delivery table 72d to be located for the convenience of the operator at a lower level than the delivery table 72 of FIG. 1. As before, however, the envelopes are caused to leave the drum 48d in a path which is tangent to the drum but secant to the slotted discs of the delivery mechanism 68d. The fact should be noted that the delivery wheel is shown and described as consisting of slotted discs only for simplicity and convenience. This is intended to comprehend an arrangement in which the slots are spaces formed between separate arms which are individually attached to a common hub or shaft member.

I have described what I believe to be the best embodiments of my invention. I do not wish, however, to be confined to the embodiments shown, but what I desire to cover by Letters Patent is set forth in the appended claims.

I claim:

1. A flap folding mechanism for envelope machines comprising, in combination, a suction drum, means for delivering previously scored envelope blanks in spaced out relation and at high speed to the drum in time with the operation of the drum, with the bottom flap leading and the seal flap trailing, said drum including a first suction means engageable with the forward margin of the envelope body for holding the body to the drum while the bottom flap is folded and means cooperating with said drum to fold said bottom flap, and a second suction means on said drum engageable with the forward margin of the seal flap of the same envelope for holding the seal flap to the drum while the body is folded relative to the seal flap and means cooperating with said drum to fold said body over said seal flap.

2. A flap folding mechanism for envelope machines as set forth in claim 1 in which distinct drum segments are provided for carrying the first and second suction means, and in which means are provided for angularly adjusting the segments relative to one another to change the distance between said suction means.

3. A flap folding mechanism as set forth in claim 1 in which the drum is of such large diameter that it requires several machine cycles to complete a single revolution, each of the suction means being repeated on the drum as many times as the number of cycles represented by a single revolution of the drum, the drum being composed of as many distinct segments as there are suction means altogether, the several suction means designed for holding the body portions of blanks being carried by a first set of alternate segments and the several suction means designed for acting upon the seal flaps of blanks being carried by a second set of alternate segments, the segments of each set forming a rigid unit, and means for angularly adjusting said units relative to one another.

4. A flap folding and delivering mechanism for envelope making machines comprising, in combination, a first drum, means for feeding previously scored individualized blanks periodically to the drum in time with the operation of the drum, suction means on the drum for holding the leading margin of a blank body portion to the drum while the bottom flap portion is folded over onto the body portion, suction means on the drum for holding the leading margin of the seal flap portion to the drum while the body portion is folded over onto the seal flap portion, means for effecting the respective folds in the order mentioned, a second drum cooperative with the first to press the folded blank and feed it downward after the second fold, means for causing the blank to be transferred from the first drum to the second drum in downgoing sectors of the two drums for transportation by the second drum to the upgoing side thereof, a comparatively slow moving, rotary, slotted carrier disposed and timed to receive in its slots the individual blanks as they are discharged upward by the second drum, and a delivery table disposed at the downgoing side of the slotted carrier in position to intercept the blanks, arrest them and force them from the carrier slots one by one for accumulation on the table in stack formation.

5. A folding mechanism for envelope making machines comprising, in combination, a drum having suction means for holding the leading margin of the seal flap of an envelope in fixed relation to the drum, and means for folding the body portion of the envelope over and back onto the seal flap comprising a second drum which runs in substantial tangential contact to the first, means carried by the first drum and operable for initially deflecting the body portion away from the first drum, and a rotary transfer member having at least one pocket disposed between said first and second drum to continue to deflect the leading portion of the body across the space adjacent the contact point of the drums and past the critical point into position to be intercepted and regularly folded by the second drum, said transfer member being disposed to present said pocket in retreating position to receive and retain the leading margin of the deflected blank until after the critical point has been passed.

6. A folding mechanism set forth in claim 5 in which the transfer member is formed with a plurality of pockets, runs closely adjacent to the two drums, and is operative in time with the envelope body deflection means to present the pockets one after another in receiving position as the successive blank bodies are deflected.

7. A flap folding mechanism for envelope machines comprising, in combination, a drum, means for delivering to the drum at high speed and in spaced out relation blanks which are divided by transverse score lines into a leading flap, a body portion and a trailing flap, said drum including a first means engageable with the forward margin of the body portion for holding the body portion to the drum while the leading flap is being folded, means for folding the leading flap while the body portion is so held, the drum also including a second means engageable with the leading margin of the trailing flap for holding the trailing flap to the drum while the body portion is being folded relative to the trailing flap, and means for folding the body portion relative to the trailing flap while the trailing flap is so held.

8. A flap folding mechanism for envelope machines comprising, in combination, a suction drum, means for delivering to the drum at high speed and in spaced out relation blanks which are divided by transverse score lines into a leading flap, a body portion and a trailing flap, said drum including a first suction means engageable with the forward margin of the body portion for holding the body portion to the drum while the leading flap is being folded, means for folding the leading flap while the body portion is so held, the drum also including a second suction means engageable with the leading margin of the trailing flap for holding the trailing flap to the drum while the body portion is being folded relative to the trailing flap, and means for folding the body portion relative to the trailing flap while the trailing flap is so held.

9. A flap folding mechanism for envelope machines comprising, in combination, a suction drum, means for delivering to the drum at high speed and in spaced out relation blanks which are divided by transverse score lines into a leading flap, a body portion and a trailing flap, said drum including a first suction means engageable with the forward margin of the body portion for holding the body portion to the drum while the leading flap is being folded, means for folding the leading flap while the body portion is so held, the drum also including a second suction means engageable with the leading margin of the trailing flap for holding the trailing flap to the drum while the body portion is being folded relative to the trailing flap, means for folding the body portion relative to the trailing flap while the trailing flap is so held, and means controlling the periods of effectiveness of said suction means so that such periods are caused to overlap, thereby assuring against any hiatus in the gripping of the blank to the drum between said folding operations.

10. A flap folding mechanism for envelope machines comprising, in combination, a suction drum, means for delivering previously scored blanks in spaced out relation and at high speed to the drum in time with the operation of the drum, with the body flap leading and the seal flap trailing, said drum including a first suction means engageable with the forward margin of the envelope body for holding the body of the blank to the drum until the bottom flap has been fully folded, means for folding the bottom flap while the blank body is so held, the drum also including a second suction means engageable with the seal flap for holding the seal flap to the drum while the body is folded relative to the seal flap, and means for folding the body relative to the seal flap while the seal flap is so held.

11. A flap folding and delivering mechanism for envelope making machines comprising, in combination, a first drum, means for feeding previously scored individualized blanks periodically to the drum in time with the operation of the drum, suction means on the drum for holding the leading margin of a blank body portion to the drum while the bottom flap portion is folded over onto the body portion, suction means on the drum for holding the leading margin of the seal flap portion to the drum while the body portion is folded over onto the seal flap portion, means for effecting the respective folds in the order mentioned, a second drum cooperative with the first to press the folded blank and feed it downward after the second fold, means for causing the blank to be transferred from the first drum to the second drum in downgoing sectors of the two drums for transportation by the second drum to the upgoing side thereof, a comparatively slow moving, rotary, slotted carrier disposed and timed to receive in its slots the individual blanks as they are discharged upward by the second drum, and a delivery table disposed at the downgoing side of the slotted carrier in position to intercept the blanks, arrest them and force them from the carrier slots one by one for accumulation on the table in stack formation, feed belts opposed to the second drum for assisting in guiding and feeding the envelopes from the first drum to the slotted carrier, and means positively driving the belts at the peripheral linear speed of the second drum.

12. Folding mechanism for envelope making machines, adapted for relatively folding a body portion and an adjoining flap portion of an envelope blank along an intervening score line comprising, in combination, a drum for carrying the blank continuously forward at high speed with one of said portions leading and the other trailing, suction means for holding the trailing portion immovably to the drum in an area closely adjacent to the score line, means for deflecting the leading portion away from the drum to initiate and carry forward the folding of the blank, including a pressing member cooperative with the drum and disposed to intercept the deflected leading portion, turn it down onto the trailing portion, and press it firmly into place, said means for deflecting the leading portion of the envelope blank away from the drum comprising reciprocatable means in said drum operating in cooperation with auxiliary means disposed between said drum and said pressing member to continue the deflection of the leading portion past the critical point between the drum and the pressing member and insure proper creasing thereof by said pressing member, the drum being of such large diameter that it makes only one revolution, travelling at the speed of the blanks in a plurality of cycles of the machine, said drum having the suction means and the reciprocatable member repeated as many times as there are operating cycles in one revolution of the drum.

13. A folding mechanism for envelope making machines adapted for relatively folding a leading body portion and a trailing sealing flap about an intervening score line comprising, in combination, a drum for carrying each blank continuously forward at high speed, means for delivering the blanks seriatim to the drum in timed relation to the operation of the drum, suction means on the drum for seizing the leading margin of the seal flap of a blank and holding it in fixed relation to the drum as the blank is carried forward, first means for deflecting the body portion of the blank away from the drum to initiate the folding operation, and second means for intercepting the deflected body portion and, in cooperation with the drum, completing the fold while the suction means continues to hold the seal flap and thereby to propel the blank forward, said first deflecting means comprising a thrust member carried by the drum and operable outward to thrust the blank body a short distance away from the drum, said second means including a continuously rotating open-mouthed transfer member adapted to receive the leading end of the deflected blank body and conduct it farther away from the drum, and a pressing second drum which runs tangent to the first drum and upon which the leading end of the envelope body is deposited by the transfer member.

14. Folding mechanism as set forth in claim 13 in which the drum is of such large diameter that it requires several cycles of the machine for making one complete revolution while running at a peripheral speed equal to the speed of blank travel, and in which the suction means and the deflecting means are repeated at equal intervals, each corresponding to one machine cycle.

15. Folding mechanism as set forth in claim 13 in which the drum is of such large diameter that it requires several cycles of the machine for making one complete revolution while running at a peripheral speed equal to the speed of blank travel, and in which the suction means and the deflecting means are repeated at equal intervals, each corresponding to one machine cycle, the second drum being composed of axially spaced discs and axially continuous combined suction and pressing segments carried thereby, the thrust members being so located on the first drum that they may travel projected through spaces of the first drum which are located between the discs and between the combined suction and pressing segments.

16. A folding mechanism for envelope making machines adapted for relatively folding a leading flap portion about a body portion and the body portion about a trailing sealing flap comprising, in combination, a drum for carrying each blank continuously forward at high speed, means for delivering the blank material to the drum in timed relation to the operation of the drum, first suction means on said drum for seizing the body portion while the leading flap portion is folded thereover, means for folding the leading flap portion over said body portion, second suction means on the said drum for seizing said sealing flap and holding it to said drum as the blank is carried forward on said drum, means for deflecting the body portion of said blank away from said drum to initiate the folding operation, and means for intercepting the deflected body portion and, in cooperation with the drum, completing the fold line while the second suction means continues to hold the seal flap and thereby to propel the blank forward on said drum.

17. A flap folding mechanism for envelope machines as set forth in claim 1 in which said last-mentioned means includes air blower means to assist the separation of said body from said drum.

18. A flap folding mechanism for envelope machines as set forth in claim 17 including a rotary transfer member disposed to receive a leading portion of the body during the initiating of said last-mentioned folding operation.

19. Apparatus for folding an envelope blank previously divided by transverse score lines into a leading flap, a body portion, and a trailing flap, comprising means for securing the leading edge of the body portion by suction to the periphery of a rotating drum, means for raising the leading flap from the drum periphery, means for creasing the raised leading flap backward over the body portion, means for securing the trailing flap to the drum, means for releasing the body portion from the drum, means for separating the folded leading flap and body portion from the drum periphery, and means for creasing the previously folded leading flap and body portion back over the trailing flap while the trailing flap is carried by the rotating drum.

20. In a machine for folding a leading flap and a trailing flap over the intermediate body portion of an envelope blank and for effecting delivery thereof to a receiving means, the combination of, first rotary means for folding the leading flap back over the body portion, second rotary means cooperative with said first rotary means for causing the folding of the trailing flap over the body portion and for continuing the advance of the blank at a relatively high initial rate of travel, a comparatively slow moving rotary envelope carrier means adapted to receive folded envelope blanks from said second rotary means, said carrier means including a plurality of overlapping curved slots extending from the periphery thereof spirally inward in the direction of rotation of said carrier means, said slots being of a width and curvature to hold the envelope blanks therein against rotational and gravitational forces acting thereon and acting to gradually decelerate the blanks to the speed of the slower moving carrier means, and a substantially flat receiving table means adjacent said carrier means for successively intercepting the leading edges of the folded envelope blanks carried within said slots so that each envelope blank is ejected therefrom and is stacked on edge upon said receiving table in substantial registry with the preceding folded envelope blanks, deposited thereon by said carrier means.

21. In combination, means for forwarding envelopes at a relatively high initial rate of travel, and a high-capacity rotary stacking device for said envelopes, said stacking device comprising slotted carrier wheel means rotationally mounted adjacent said forwarding means for receiving envelopes therefrom said carrier wheel means being rotated at a slower peripheral speed than the rate of travel of said forwarding means and including a plurality of curved overlapping slots extending inwardly from the periphery of the wheel means toward the axis of rotation, said slots acting to gradually declerate the envelopes from their initial rate of travel upon said forwarding means to the slower speed of said carrier wheel means, and means for intercepting the leading edge of said envelopes thereby ejecting each of the envelopes from said slots and collecting the successively ejected envelopes in stacked-on-edge registry with the face side of one envelope facing the rear side of an adjacent previously deposited envelope.

22. The combination according to claim 21, wherein said last-mentioned means includes a delivery table extending in secant relationship to said carrier wheel.

23. In a machine for folding a leading flap and a trailing flap over the intermediate body portion of an envelope blank and delivery thereof to a receiving means, the combination of first rotary means for folding the leading flap back over the body portion, second rotary means cooperative with said first rotary means for causing the folding of the trailing flap over the body portion, and for removing the folded blanks therefrom and for forwarding the blanks at a relatively high initial rate of travel, third rotary means adapted to rotate at a peripheral speed less than the rate of blank travel upon said second rotary means, a plurality of overlapping spiral slots extending radially inward from the periphery of said third rotary means adapted to receive folded envelope blanks from said second rotary means and progressively decelerate the blanks from their high initial rate of travel to the rate of travel of said third rotary means, delivery table means adjacent said third rotary means, and means for ejecting the envelope blanks from said slots to said delivery table means, each of the aforesaid rotary means and said table means being arranged and related to one another to transport said envelope blanks in a continuous non-interrupted forward direction.

24. In a machine for folding a leading flap and a trailing flap over the intermediate body portion of an envelope having previously folded side flaps and for effective delivery thereof to a receiving means, the combination of, a rotary drum for advancing the envelopes at a relatively high initial rate of travel, first means for folding the leading flap back over the body portion while the envelope is advanced at the peripheral speed of said drum, second means cooperative with said first means for causing the folding of the trailing flap over the body portion while the envelope continues to be advanced at the peripheral speed of said drum, a comparatively slow moving rotary envelope carrier means adapted to receive folded envelopes from said rotary drum, said carrier means including a plurality of overlapping curved slots extending from the periphery thereof inwardly in the direction of rotation of said carrier means, said slots having a width and curvature to hold envelopes therein against rotational forces and acting to gradually decelerate the envelopes from their high initial rate of travel to the rate of travel of said carrier means, and a substantially flat receiving table means adjacent said carrier means for successively intercepting the leading edges of the envelopes carried within said slots so that each envelope is ejected therefrom and is stacked on edge upon said receiving table in substantial registry with the preceding envelopes deposited thereon by said carrier means.

25. A high speed flap folding and delivering mechanism for envelope making machines comprising, first means for conveying envelope blanks, the side flaps of which have been previously folded and the body of which has been divided by transverse score lines into a leading flap, a trailing flap and an intermediate body portion, in spaced out relation in one direction at a high initial rate of speed, second means for receiving the blanks from said first means and for continuing the conveyance of the blanks at the same speed and in the same direction and orientation as said first means, said second means including, means for folding the leading flap back over the body portion, and means for folding the body portion and folded leading flap, as a unit, back over the trailing flap, rotary means having a plurality of overlapping spiral slots extending inwardly from the periphery thereof for receiving the spaced out folded envelopes from said second means and positioning the envelopes in overlapped relation thereby gradually decelerating the envelope from its rate of travel upon the second means, and means for withdrawing the envelopes from said slots and stacking said envelopes in on-edge relationship thereby further decelerating the envelopes' rate of travel.

26. Apparatus for folding and stacking envelope blanks previously divided by transverse score lines into a leading flap, a body portion, and a trailing flap, comprising means for securing the leading edge of the body portion by suction to the periphery of a rotating drum, means for raising the leading flap from the drum periphery, means for creasing the raised leading flap backward over the body portion, means for securing the trailing flap to the drum, means for releasing the body portion from the drum, means for separating the folded leading flap and body portion from the drum periphery, means for creasing the previously folded leading flap and body portion back over the trailing flap while the trailing flap is carried by the rotating drum, means for receiving the folded envelopes from said drum and conveying them in partial overlapped relation thereby partially decelerating the blanks from their rate of travel upon said rotating drum, and means for further declerating the envelopes and placing them in fully overlapped stacked relationship.

References Cited in the file of this patent

UNITED STATES PATENTS

| | | |
|---|---|---|
| 1,678,895 | Wood | July 31, 1928 |
| 1,691,027 | Novick | Nov. 6, 1928 |
| 1,713,243 | Swab | May 14, 1929 |
| 2,041,301 | Scholl et al. | May 19, 1936 |
| 2,612,088 | Heywood | Sept. 30, 1952 |
| 2,643,594 | Sauerman | June 30, 1953 |
| 2,800,841 | Welsh | July 30, 1957 |